United States Patent
Terrero et al.

(10) Patent No.: US 10,682,843 B2
(45) Date of Patent: Jun. 16, 2020

(54) SYSTEM AND METHOD FOR INDEXING A THREE-DIMENSIONAL (3D) OBJECT DURING PRINTING OF THE OBJECT

(71) Applicant: Xerox Corporation, Norwalk, CT (US)

(72) Inventors: Carlos M. Terrero, Ontario, NY (US); Roberto A. Irizarry, Rochester, NY (US); Jacob R. McCarthy, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 528 days.

(21) Appl. No.: 15/598,563

(22) Filed: May 18, 2017

(65) Prior Publication Data

US 2018/0333923 A1 Nov. 22, 2018

(51) Int. Cl.
*B33Y 30/00* (2015.01)
*B41J 3/407* (2006.01)

(52) U.S. Cl.
CPC ............ *B33Y 30/00* (2014.12); *B41J 3/4073* (2013.01)

(58) Field of Classification Search
CPC ............................... B33Y 30/00; B41J 3/4073

USPC ......................................................... 347/104
See application file for complete search history.

(56) References Cited

U.S. PATENT DOCUMENTS

| 6,923,115 | B1 | 8/2005 | Litscher et al. |
| 7,120,300 | B1 | 10/2006 | Sankar |
| 7,765,931 | B2 | 8/2010 | Kennedy, III et al. |
| 9,114,282 | B2 | 8/2015 | Kennedy, III |
| 2002/0097280 | A1* | 7/2002 | Loper ............... B41J 3/4073 347/2 |
| 2005/0178279 | A1 | 8/2005 | Valls |
| 2009/0256897 | A1 | 10/2009 | Polk et al. |
| 2011/0012952 | A1 | 1/2011 | Chang et al. |

* cited by examiner

*Primary Examiner* — Huan H Tran
*Assistant Examiner* — Alexander D Shenderov
(74) *Attorney, Agent, or Firm* — Maginot Moore & Beck LLP

(57) ABSTRACT

A direct-to-object printer includes an object indexing subsystem. The object indexing subsystem includes an indexer actuator that operates a rotating indexer to rotate a collar in which an object is mounted. The amount of collar rotation enables the object held by the collar to be turned a predetermined angular amount so operation of the indexing subsystem between passes by a plurality of printheads enables different portions of a curved object surface to be printed during different passes.

17 Claims, 5 Drawing Sheets

SYSTEM AND METHOD FOR INDEXING A THREE-DIMENSIONAL (3D) OBJECT DURING PRINTING OF THE OBJECT

TECHNICAL FIELD

This disclosure relates generally to a system for printing on three-dimensional (3D) objects, and more particularly, to systems that print on cylindrical or other rounded objects.

BACKGROUND

Commercial article printing typically occurs during the production of the article. For example, ball skins are printed with patterns or logos prior to the ball being completed and inflated. Consequently, a non-production establishment, such as a distribution site or retail store, for example, in a region in which potential product customers support multiple professional or collegiate teams, needs to keep an inventory of products bearing the logos of various teams popular in the area. Ordering the correct number of products for each different logo to maintain the inventory can be problematic.

One way to address these issues in non-production outlets is to keep unprinted versions of the products, and print the patterns or logos on them at the distribution site or retail store. Printers known as direct-to-object (DTO) printers have been developed for printing individual objects. These DTO printers have a plurality of printheads that are arranged in a vertical configuration with one printhead over another printhead. These printheads are fixed in orientation. When the objects to be printed are rounded, such as balls, water bottles, and the like, a complete ink image cannot be printed on the surface because the rounded surface falls away from the planar face of the printheads. Enabling DTO printers to be able to print ink images on all or a portion of the circumference of a rounded object would be beneficial.

SUMMARY

A new three-dimensional (3D) object printing system enables rounded objects to be printed more completely. The printing system includes a plurality of printheads, each printhead in the plurality of printheads being configured to eject marking material, an object indexing subsystem configured to hold an object and to move the object past the plurality of printheads to receive marking material ejected from the printheads. The object indexing subsystem includes a collar configured to grip a portion of the object, a rotating indexer attached to the collar, and an indexer actuator configured to move and rotate the rotating indexer in response to the indexer actuator engaging the rotating indexer, a planar member positioned to engage the indexer actuator and move the indexer actuator into engagement with the rotating indexer to enable the indexer actuator to move and rotate the rotating indexer and the collar to turn the object and enable another portion of the object to receive marking material from the plurality of printheads.

An object indexing subsystem enables rounded objects to be printed more completely in DTO printers. The object indexing subsystem includes a collar configured to grip a portion of the object, a rotating indexer attached to the collar, and an indexer actuator configured to move and rotate the rotating indexer to turn the object held by the collar by a predetermined angular amount.

BRIEF DESCRIPTION OF THE DRAWINGS

The foregoing aspects and other features of a printing system and an object indexing subsystem that enables rounded objects to be printed more completely are explained in the following description, taken in connection with the accompanying drawings.

DETAILED DESCRIPTION

Figure 1:
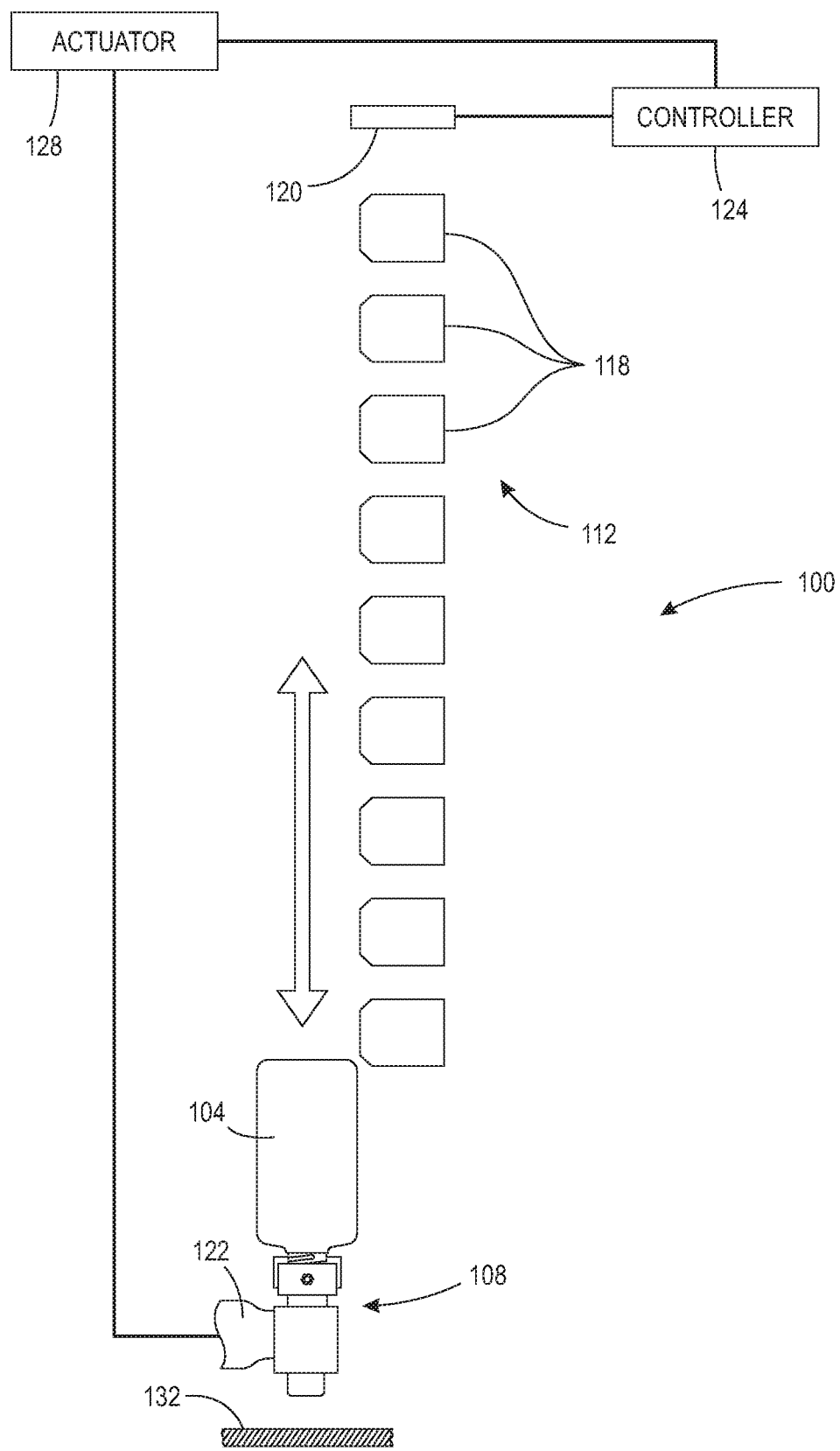
FIG. 1 is a schematic diagram of a side view of a DTO printing system having an object indexing subsystem that enables rounded objects to be printed more completely.

For a general understanding of the present embodiments, reference is made to the drawings. In the drawings, like reference numerals have been used throughout to designate like elements.

FIG. 1 depicts a direct-to-object (DTO) printing system 100 configured to print the surface of an object 104 secured within an object indexing subsystem 108 as the subsystem 108 moves the object 104 past an array 112 of printheads 118. The arm 122 to which the object indexing subsystem 108 is attached moves bidirectionally opposite the printheads 118 in the array 112 as indicated by the arrow in the figure. The controller 124 is configured to operate the actuator 128 to move the arm 122 and the object indexing system 108 after the object is mounted into the subsystem 108. Controller 124 is configured to operate the printheads 118 in the array 112 to eject marking material onto the surface of the object 104. If one or more of the printheads 118 in the array 112 ejects ultraviolet (UV) ink, then the UV curing device 120 is operated by controller 124 to cure the UV ink. As used in this document, "UV light" refers to light having a wavelength that is shorter than visible light, but longer than X-rays. The wavelength of such light is about 10 nm to about 400 nm. A planar member 132 is positioned at one end of the path of movement for the object indexing subsystem 108 to actuate the indexing mechanism in the object indexing subsystem as described in more detail below.

Figure 2A:
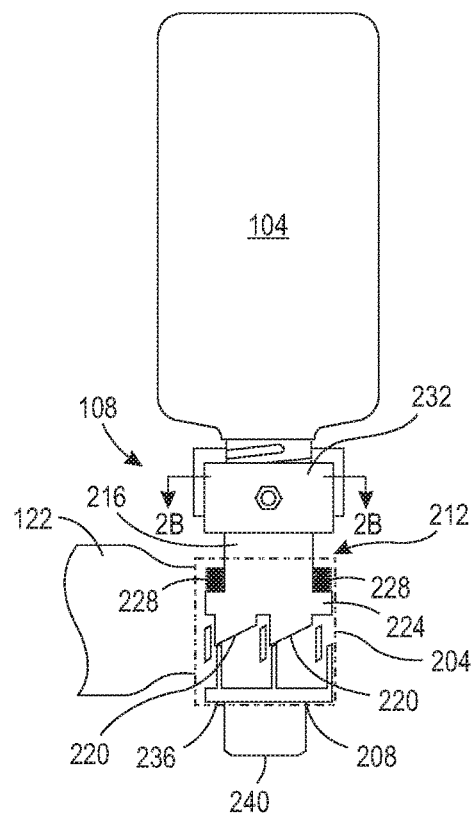
FIG. 2A depicts an embodiment of the object indexing subsystem used in the printing system of FIG. 1.

FIG. 2A is an illustration of an embodiment of the object indexing subsystem 108 that can be used in the printing system 100. As used in this document, the word "subsystem" refers to two or more components that are operated to perform a particular function within a larger system. The subsystem 108 includes a sleeve 204 to which the arm 122 is attached. As used in this document, the word "sleeve" means a cylindrical member having a hollow bore through the member that is aligned with the longitudinal axis of the member. The sleeve 204 has a bore 208 having a first and a second end. A cylindrical member 216 that extends from a rotating indexer 212 extends through the first end of the bore 208. As used in this document, the term "rotating indexer" means a device configured to rotate a predetermined angular amount each time the device is actuated. The rotating indexer 212 also includes lugs 220 positioned within the bore 208 of the sleeve 204 that have slanted surfaces for rotating the indexer 212. As used in this document, the word "lug" means structure that extends from a surface into space adjacent the surface. A circular flange 224 extends from the cylindrical member 216. A plurality of biasing members 248 is interposed between a solid portion of the sleeve 204 that surrounds the bore 208 and the circular flange 224. In an alternative embodiment, a single biasing member can fit about the cylindrical member within the sleeve 204. In the embodiment shown in FIG. 2A, the biasing members 228 are springs. A collar 232 is fixedly mounted to the cylindrical member 216. An indexer actuator 236 positioned within the bore 208 of the sleeve 204 has a cylindrical member 240 that extends through the second end of the bore 208. This indexer actuator is operated by contact of the cylindrical member 240 with the planar member 132 as described below.

Figure 2B:
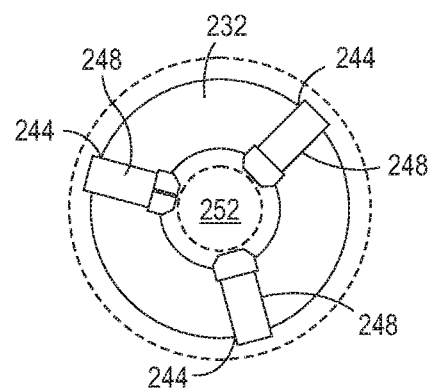
FIG. 2B depicts an object holding collar in the object indexing subsystem of FIG. 2A.
Figure 2C:
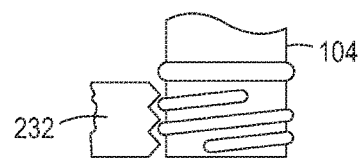
FIG. 2C depicts an embodiment of the object holding collar that accommodates threads on the neck of an object.

A view of the collar 232 from above the collar is shown in FIG. 2B. The collar 232 includes three threaded passageways 244 into which three threaded members 248 have been inserted. Each threaded member 248 terminates into an opening 252 in the collar 232. By turning the threaded members 248 in the passageways 244 of the collar 232, the rounded ends of the threaded members 248 can be extended into and retracted from the opening 252 in the collar 232. This operation of the threaded members 248 enables a portion of an object, such as the neck of a bottle, to be secured and subsequently released from the collar 228. In one embodiment, the rounded ends of the threaded members 232 are configured with structure that is complementary to the threading on a bottle neck as shown in FIG. 2C. As used in this document, "collar" means a planar member having an opening and at least one member that varies the size of the opening to secure selectively an object with a predetermined orientation.

In an alternative embodiment, a chuck can be mounted about the cylindrical member 224 so the chuck can rotate in a first direction about the cylindrical member 224 to advance movable members of the chuck into the opening 252 to secure an object within the collar in a known manner. Reversing the rotation of the chuck releases the object from the collar. In another embodiment of a chuck, the movable members of the chuck come together at the center of the opening 252 and rotation of the chuck in the first direction moves the members toward the circumference of the opening 252 so the members can be inserted into an opening of an object and the rotation in the first direction urges the members against the circumference of the object opening to hold the object for printing. Reversing the rotation of the chuck brings the members together in the center of the opening to reduce the pressure against the circumference of the object opening so the object can be removed.

Figure 3A:
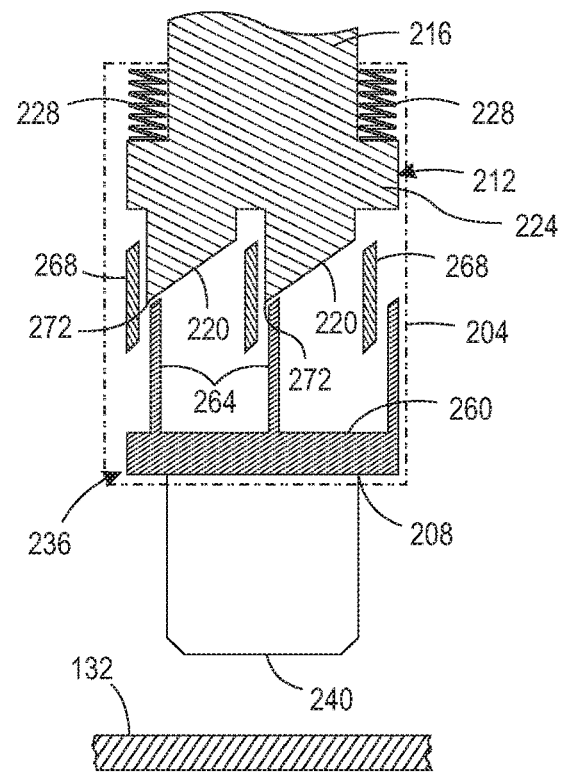
FIG. 3A to FIG. 3E depicts an operation of the object indexing subsystem of FIG. 2A that rotates an object held within the collar of the object indexing subsystem by a predetermined angular amount.

Operation of the indexing subsystem 108 is now described with reference to FIG. 3A to FIG. 3E. In FIG. 3A, the lugs 220 of the rotating indexer 212 rest on actuator members 264 that extend from a support member 260 of the indexer actuator 236, which is positioned in the bore 208 of sleeve 204. Ribs 268 extend from the circumferential wall of the sleeve 204 to form chambers that accommodate a single lug 220 of the rotating indexer 212. Thus, the number of chambers formed by the ribs 268 and the number of lugs 220 are equal and correspond to one another in a one-to-one correspondence. In this position, the biasing members 228 are extended between the cylindrical flange 224 of the rotating indexer 212 and an upper surface of the bore 208 within the sleeve 204. In this position, the indexing subsystem 108 is carried by the arm 122 as it moves past the printhead array 112 for printing and by UV curing station 120, if required to cure UV ink. The controller 124 then operates the actuator 128 to return the indexing subsystem 108 to its starting position. As used in this document, the word "ribs" refers to a plurality of protuberances that protrude from a wall and are aligned in a same direction to divide the wall into a series of segments with each segment extending between two adjacent ribs.

Figure 3B:
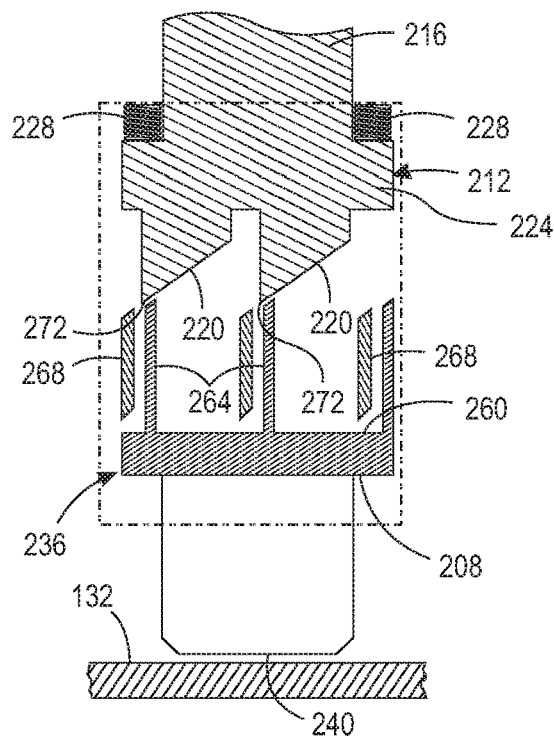

If a different area of the object 104 is to be printed, the actuator 128 is operated to push cylindrical member 240 into planar member 132 as shown in FIG. 3B. This pushing causes the actuator members 264 to urge the lugs 220 of the rotating indexer 212 away from the planar member 132 and compress the biasing members 228 between the cylindrical flange 224 and the upper surface of the bore 208 until the pointed ends 272 of the lugs 220 are raised above the upper ends of ribs 268. This action enables the rotating actuator 212 to rotate and position the lugs into the next adjacent chamber in the bore 208.

Figure 3C:
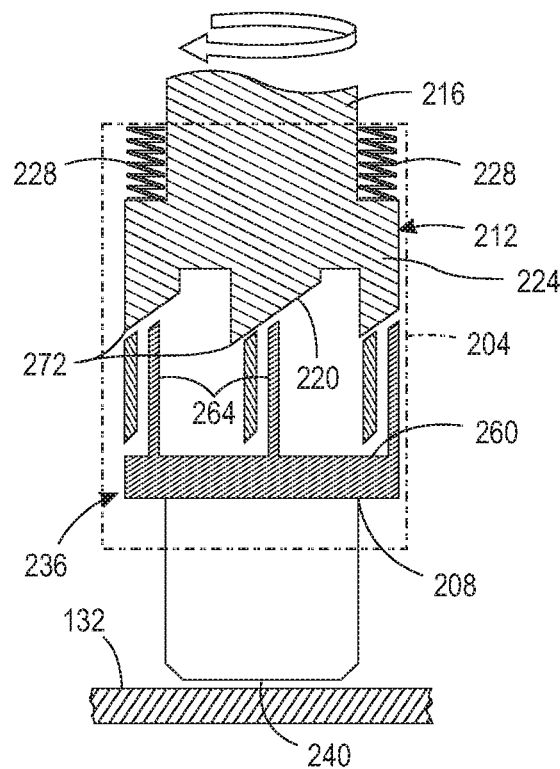
Figure 3D:
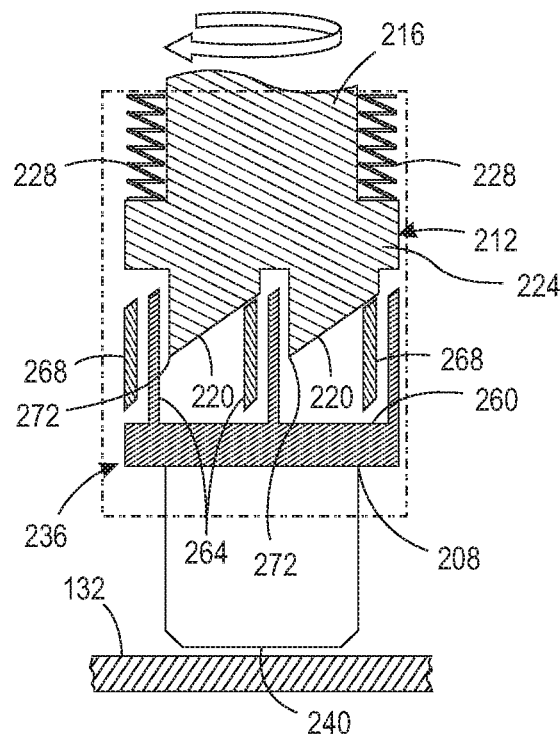
Figure 3E:
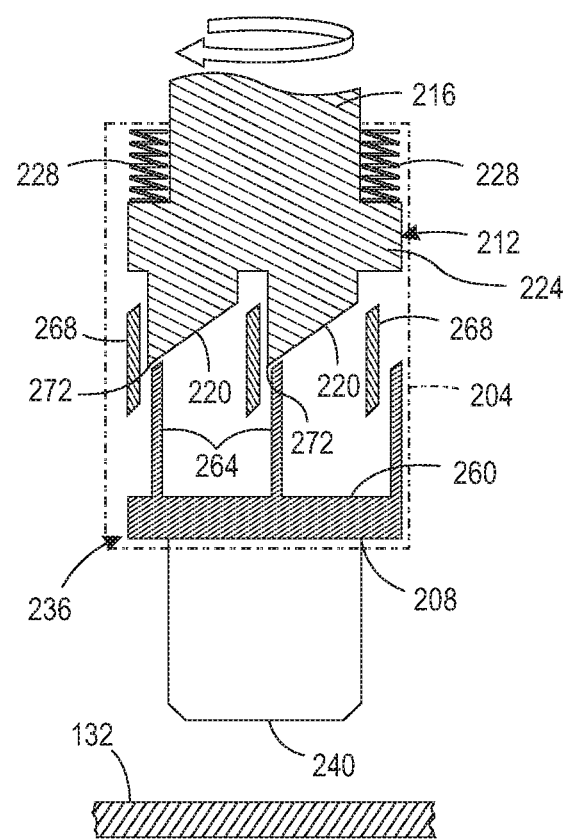

As the pressure of cylindrical member 240 against the planar member 132 is released as the controller 124 operates the actuator 128 to reverse its motion of the arm 122 to move the object 104 past the printhead array 112 again, the biasing members 228 push the lugs 220 against the actuator members 264 and the upper ends of the ribs 268. In response, the slanted surfaces of the lugs 220 slide along the upper ends of the ribs 268 and the actuator members 264 and this action rotates the rotating indexer 212 as shown in FIG. 3C. The sliding of the slanted surfaces of the lugs 220 on the ribs 268 and the actuator members 264 and the rotation of the rotating indexer continues as shown in FIG. 3D. This sliding and rotation ceases when the end of the slanted surfaces of the lugs 220 closest to the cylindrical flange 224 slip past the upper ends of the ribs 268. At that position, the lugs 220 are seated in the next chambers formed by the ribs 268 that were adjacent to the chambers in which the lugs were seated prior to the commencement of the indexing action as shown in FIG. 3E. The rotation of the lugs 220 to the next adjacent chamber in the sleeve 204 indexes the surface of the object 104 by a predetermined angular amount so a new portion of the surface is presented to the printheads as the actuator 128 moves the arm 122 past the array 112. This indexing process can continue until an entire circumference of an object is printed.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A printing system comprising:
   a plurality of printheads, each printhead in the plurality of printheads being configured to eject marking material;
   an object indexing subsystem configured to hold an object and to move the object past the plurality of printheads to receive marking material ejected from the printheads, the object indexing subsystem having:
      a collar configured to grip a portion of the object;
      a rotating indexer attached to the collar; and
      an indexer actuator configured to move and rotate the rotating indexer in response to the indexer actuator engaging the rotating indexer;
   a planar member positioned to engage the indexer actuator and move the indexer actuator into engagement with the rotating indexer to enable the indexer actuator to move and rotate the rotating indexer and the collar to turn the object and enable another portion of the object to receive marking material from the plurality of printheads.

2. The printing system of claim 1, the object indexing subsystem further comprising:
- a sleeve having a cylindrical wall and a bore within the cylindrical wall, at least a portion of the rotating indexer and a portion of the indexer actuator being positioned within the sleeve;
- the rotating indexer including a cylindrical member that extends from the bore of the sleeve for attachment to the collar; and
- the indexer actuator including a cylindrical member extending from the bore of the sleeve to enable engagement of the indexer actuator with the planar member.

3. The printing system of claim 2, the object indexing subsystem further comprising:
- at least one biasing member positioned between a portion of the rotating indexer within the sleeve and the collar.

4. The printing system of claim 3 wherein the at least one biasing member is a plurality of biasing members positioned between a circular flange of the rotating indexer and a portion of the sleeve.

5. The printing system of claim 4, the rotating indexer further comprising:
- a plurality of lugs extending from the circular flange toward the indexer actuator.

6. The printing system of claim 5, the indexer actuator further comprising:
- a plurality of actuator members extending from the indexer actuator to engage the lugs of the rotating indexer.

7. The printing system of claim 6, the sleeve further comprising:
- a plurality of ribs extending from the wall of the sleeve.

8. The printing system of claim 7, the collar further comprising:
- a plurality of passageways extending radially from an opening in the collar to a circumferential wall of the collar; and
- a plurality of members, the members extending through the passageways in a one-to-one correspondence with the passageways.

9. The printing system of claim 8 wherein the members in the plurality of members are configured to receive threads in a portion of the object held by the collar.

10. An object indexing subsystem comprising:
- a collar configured to grip a portion of the object;
- a rotating indexer attached to the collar;
- an indexer actuator configured to move and rotate the rotating indexer to turn the object held by the collar by a predetermined angular amount;
- a sleeve having a cylindrical wall and a bore within the cylindrical wall, at least a portion of the rotating indexer and a portion of the indexer actuator being positioned within the sleeve;
- the rotating indexer further including a cylindrical member that extends from the bore of the sleeve for attachment to the collar; and
- the indexer actuator further including a cylindrical member extending from the bore of the sleeve to enable engagement of the indexer actuator with a planar member.

11. The object indexing subsystem of claim 10 further comprising:
- at least one biasing member positioned between a portion of the rotating indexer within the sleeve and the collar.

12. The object indexing subsystem of claim 11 wherein the at least one biasing member is a plurality of biasing members positioned between a circular flange of the rotating indexer and a portion of the sleeve.

13. The object indexing subsystem of claim 12, the rotating indexer further comprising:
- a plurality of lugs extending from the circular flange toward the indexer actuator.

14. The object indexing subsystem of claim 13, the indexer actuator further comprising:
- a plurality of actuator members extending from the indexer actuator to engage the lugs of the rotating indexer.

15. The object indexing subsystem of claim 14, the sleeve further comprising:
- a plurality of ribs extending from the wall of the sleeve.

16. The object indexing subsystem of claim 15, the collar further comprising:
- a plurality of passageways extending radially from an opening in the collar to a circumferential wall of the collar; and
- a plurality of members, the members extending through the passageways in a one-to-one correspondence with the passageways.

17. The object indexing subsystem of claim 16 wherein the members in the plurality of members are configured to receive threads in a portion of the object held by the collar.

\* \* \* \* \*